March 12, 1968  A. W. SCHNIZER ET AL  3,373,234
FORMATION OF CELLULAR OXYMETHYLENE POLYMER STRUCTURES
Filed July 28, 1964
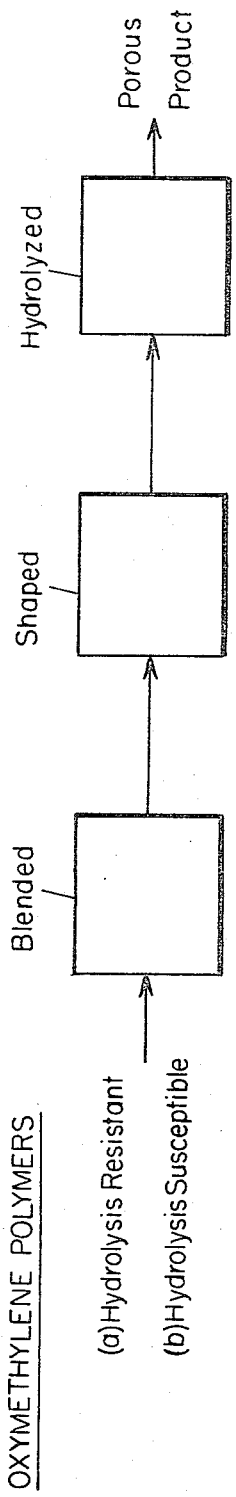
Inventors
Arthur W. Schnizer
Walter E. Heinz
By Kenneth A. Genoni
ATTORNEY

United States Patent Office 3,373,234
Patented Mar. 12, 1968

3,373,234
FORMATION OF CELLULAR OXYMETHYLENE POLYMER STRUCTURES
Arthur W. Schnizer, Corpus Christi, Tex., and Walter E. Heinz, Frankfurt am Main, Germany, assignors to Celanese Corporation, a corporation of Delaware
Filed July 28, 1964, Ser. No. 385,803
7 Claims. (Cl. 264—49)

ABSTRACT OF THE DISCLOSURE

Disclosed herein is a process for preparing strong, porous structures. In accordance with this invention, the structures are made by blending a mixture of two oxymethylene polymers which have different levels of resistance to alkaline hydrolysis, forming the mixture into a shaped article, and then at least partially removing one of the oxymethylene polymers by alkaline hydrolysis. This results in a strong, porous structure which is resistant to alkaline hydrolysis and which has cavities within the polymeric structure which results from the removal of the less resistant oxymethylene polymer.

---

This invention relates to cellular structures of oxymethylene polymers and to processes for making them.

In general the cellular structures of this invention may be made by forming a mixture of two oxymethylene polymers which are of different levels of resistance to alkaline hydrolysis, as described below. The mixture of polymers, as shown on the attached drawing, is formed into a shaped article and then one of the oxymethylene polymers is removed by an alkaline hydrolysis process. This results in a shaped cellular structure of the oxymethylene polymer which is resistant to the alkaline hydrolysis with cavities within the polymeric structure which result from the removal of the less resistant oxymethylene polymer.

Oxymethylene polymers are those having recurring oxymethylene units and may be prepared by the polymerization of formaldehyde or trioxane, a cyclic trimer of formaldehyde. Typical oxymethylene polymers include oxymethylene homopolymers and copolymers. Certain oxymethylene copolymers have been found to be particularly resistant to alkaline hydrolysis as disclosed below.

Preferred oxymethylene copolymers are those having at least one chain containing recurring oxymethylene units interspersed with —OR— groups in the main polymer chain, where R is a divalent radical containing at least two carbon atoms directly linked to each other and positioned in the polymer chain between the two valances, with any substituents on said radical being inert, that is, those which are free of interfering functional groups and do not induce undesirable reactions under the conditions involved. Particularly preferred are copolymers which contain from 60 to 99.6 mol percent of recurring oxymethylene groups and from 0.4 to about 40 mol percent of —OR— group. Most preferred are those polymers having from 85% to 99.6 mol percent of recurring oxymethylene groups and from 0.4 to 15 mol percent of —OR— groups. In a preferred embodiment R may be, for example, an alkylene or substituted alkylene group containing at least two carbon atoms.

Among the oxymethylene copolymers which may be utilized in accordance with this aspect of the invention are those having a structure comprising recurring units having the formula

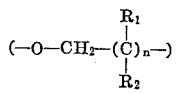

wherein $n$ is an integer from zero to 5 and wherein $m$ is zero in from 60 to 99.6 mol percent of the recurring units. $R_1$ and $R_2$ are inert substituents, that is, substituents which are free of interfering functional groups and will not induce undesirable reactions.

A preferred class of oxymethylene copolymers are those having a structure comprising oxymethylene and oxyethylene recurring units wherein from 60 to 99.6 mol percent of the recurring units are oxymethylene units.

Particularly preferred oxymethylene polymers are those having incorporated therein oxyalkylene units having adjacent carbon atoms which are derived from cyclic ethers having adjacent carbon atoms. These copolymers may be prepared by copolymerizing trioxane or formaldehyde with a cyclic ether having the structure

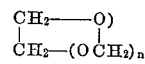

where $n$ is an integer from zero to 2.

Examples of preferred oxymethylene polymers include copolymers of trioxane and cyclic ethers containing at least two adjacent carbon atoms such as the copolymers disclosed in U.S. Patent No. 3,027,352 by Cheves T. Walling, Frank Brown and Kenneth W. Bartz, which patent is assigned to the same assignee as the subject application.

Among the specific cyclic ethers which may be used are ethylene oxide; 1,3-dioxolane; 1,3,5-trioxepane; 1,3-dioxane; trimethylene oxide; pentamethylene oxide; 1,2-propylene oxide; 1,2-butylene oxide; neopentyl formal; pentaerythritol diformal; paraldehyde; terahydrofuran and butadiene monoxide.

As used in the specification and claims of the subject application, the term "oxymethylene" includes substituted oxymethylene, where the substituents are inert with respect to the reactions in question, that is, the substituents are free of interfering functional groups and will not introduce undesirable reactions.

As used in the specification and claims of this application, the term "copolymer" means polymers having two or more monomeric groups, including terpolymers and higher polymers. Suitable oxymethylene terpolymers include those disclosed in U.S. patent application Ser. No. 229,715 filed Oct. 10, 1962 by W. E. Heinz and F. B. McAndrew and now abandoned which is assigned to the same assignee as the subject application.

The preferred oxymethylene copolymers which are treated in this invention are thermoplastic materials having a melting point of at least 150° C. and are normally millable at a temperature of 200° C. They have a number average molecular weight of at least 10,000. These polymers have a high thermal stability. For example, if a sample of oxymethylene copolymer, which has been chemically stabilized as described below, is placed in an open vessel in a circulating air oven at a temperature of 230° C. and its weight loss is measured without removal of the sample from the oven, it will have a thermal degradation rate of less than 1.0 wt. percent/min. for the first 45 minutes and, in preferred instances, less than 0.1 wt. percent/min. for the same period of time. The preferred oxymethylene polymers which are treated in this invention have an inherent viscosity of at least one (measured at 60° C. in an 0.1 weight percent solution in p-chlorophenol containing 2 weight percent of α-pinene). The preferred oxymethylene copolymers exhibit remarkable alkaline stability. For example, if the chemically stabilized copolymers are refluxed at a temperature of about 142°–145° C. in a 50% solution of sodium hydroxide in water for a period of 45 minutes, the weight of the copolymer will be reduled by less than one percent.

The preferred oxymethylene copolymers are preferably stabilized by degradation of the molecular ends to a point where a stable carbon-to-carbon linkage exists at each end.

Thermal degradation, as disclosed in U.S. Patent No. 3,103,499 by Thomas J. Dolce and Frank M. Berardinelli, or degradation by hydrolysis, as disclosed in application Ser. No. 102,097, filed Apr. 11, 1961, by Frank M. Berardinelli and now abandoned, may be used. These inventions are assigned to the same assignee as the subject application.

Other oxymethylene polymers are methods of preparation therefore are disclosed in an article Kern et al., Angewandte Chemie 73(6) 177–186 (Mar. 21, 1961) including polymers containing repeating carbon-to-carbon single bonds in the polymer chain by copolymerizing trioxane with cyclic ethers such as dioxane, lactones such as beta-propiolactone, anhydrides such as cyclic adipic anhydride and ethylenically unsaturated compounds such as styrene, vinyl acetate, vinyl methyl ketone, acrolein, etc. Also these and other oxymethylene polymers are disclosed by Sittig in Petroleum Refiner, volume 41, Number 11, November 1962, pages 131 through 170.

Any suitable catalyst suitable for the polymerization of trioxane or formaldehyde by themselves or with other materials may be used to provide the oxymethylene polymers which are treated in accordance with this invention. Preferred catalysts are cationic catalysts including such inorganic fluorine-containing catalysts as boron trifluoride, antimony trifluoride, antimony fluoroborate, bismuth trifluoride, bismuth oxyfluoride, nickelous fluoride, aluminum trifluoride, titanium tetrafluoride, manganous fluoride, manganic fluoride, mercuric fluoride, silver fluoride zinc fluoride, ammonium bifluoride, phosphorous pentafluoride, hydrogen fluoride, and compounds containing these materials such as boron fluoride coordinate complexes with organic compounds, particularly those in which oxygen or sulfur is a donor atom.

Other suitable catalysts include thionyl chloride, fluorosulfonic acid, methane sulfonic acid, phosphorous trichloride, titanium tetrachloride, ferric chloride, zirconium tetrachloride, aluminum trichloride, stannic chloride and stannous chloride.

The particularly preferred catalysts are boron fluoride and boron fluoride-containing materials such as boron fluoride monohydrate, boron fluoride dihydrate and boron fluoride trihydrate as well as boron fluoride coordinate complexes with organic compounds as mentioned previously.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is a preferred coordinate complex. The boron fluoride complex with diethyl ether is also very effective. Other boron fluoride complexes which may be used are the complexes with methyl acetate, with ethyl acetate, with phenyl acetate, with dimethyl ether, with methyl phenyl ether and with dimethyl sulfide. Suitable catalysts are disclosed in U.S. Patents 2,989,505, 2,989,506, 2,989,507, 2,989,508, 2,989,509, all of which are by Donald E. Hudgin and Frank M. Berardinelli; 2,989,510 by George J. Bruni; and 2,989,511 by Arthur W. Schnizer. All the above patents are assigned to the same assignee as the subject application.

In addition to the above-mentioned oxymethylene copolymers, oxymethylene homopolymers of trioxane or formaldehyde may also be treated in accordance with this invention. It may be desirable to "end cap" the homopolymer molecules by the known methods of etherification or esterification.

It may be desirable in a preferred embodiment of this invention to incorporate one or more thermal stabilizers into the oxymethylene polymer. The proportion of thermal stabilizer incorporated into the oxymethylene polymers depends upon the specific thermal stabilizer used. A proportion between about 0.05 and 10 wt. percent (based on the weight of polymer) has been found to be suitable for most thermal stabilizers.

One suitable thermal stabilizer system is a combination of (1) an antioxidant ingredient such as phenolic antioxidant, and most suitably, a substituted bisphenol, and (2) an ingredient to inhibit chain scission, generally a compound or a polymer containing trivalent nitrogen atoms.

A suitable class of alkylene bisphenols includes compounds having from 1 to 4 carbon atoms in the alkylene group and having from zero to 2 alkyl substitutents on each benzene ring, each alkyl substituent having from 1 to 4 carbon atoms. The preferred alkylene bisphenols are 2,2'-methylene bis-(4-methyl-6-tertiary butyl phenol) and 4,4'-butylidene bis-(6-tertiary butyl-3-methyl phenol). Suitable phenolic stabilizers other than alkylene bisphenols include 2,6-ditertiary butyl-4-methylphenol, p-phenylphenol and octylphenol.

Suitable scission inhibitors include carboxylic polyamides, polyurethanes, substituted polyacrylamides, polyvinyl pyrollidone, hydrazines, compounds having 1 to 6 amide group proteins, compounds having tertiary amine and terminal amide groups, compounds having amidine groups, cycloaliphatic amine compounds, aliphatic acylureas and compounds containing at least two epoxy groups. Suitable scission inhibitors as well as suitable antioxidants and proportions are disclosed in application Ser. No. 826,115, filed by Dolce on July 10, 1959, now Patent No. 3,152,101; application Ser. No. 831,720, filed by Dolce, Berardinelli and Hudgin on Aug. 5, 1959, now Patent No. 3,144,431; application Ser. No. No. 838,427, filed by Berardinelli on Sept. 8, 1959 and now abandoned; application Ser. No. 838,832, filed by Dolce and Hudgin on Sept. 9, 1959, now Patent No. 3,200,090; application Ser. No. 841,690, filed by Kray and Dolce on Sept. 23, 1959 and now abandoned; application Ser. No. 1,457, filed by Dolce and Berardinelli on Jan. 11, 1960, now Patent No. 3,133,896; application Ser. No. 4,881, filed by Kray and Dolce on Jan. 27, 1960, now Patent No. 3,156,669; application Ser. No. 147,092, filed by Dolce and Prichard on Oct. 23, 1961, now Patent No. 3,210,318; and French Patent No. 1,273,219. The above applications are assigned to the assignee of the present application. The disclosures of the above-mentioned applications and patent are incorporated herein by reference.

The thermal stabilizers may be incorporated into the oxymethylene polymer by dissolving both the polymer and the thermal stabilizer in a common solvent and thereafter evaporating the solution to dryness. Alternatively, the thermal stabilizers may be incorporated into the polymer by applying a solution of the thermal stabilizer to finely divided polymer, as in a slurry, and thereafter filtering the polymer and evaporating to dryness. The thermal stabilizer, in finely divided dry state may be blended into finely divided polymer in any suitable blending apparatus.

One suitable method of incorporation of the chemical thermal stabilizers is by blending a dry solid thermal stabilizer into the plastic polymer, while the latter is being kneaded as on heated rolls or through an extruder.

Certain oxymethylene homopolymers have been found to be resistant to alkaline hydrolysis also. These are homopolymers which have been "end capped" by ether end groups as disclosed for example in the above mentioned Kern et al. and Sittig articles, as well as British Patent 868,365. While it is preferred to use the oxymethylene copolymers as the hydrolysis-resistant polymer, the ether end capped oxymethylene homopolymer may be suitable in certain instances. The preferred homopolymers have a melting point of at least 150° C.

When oxymethylene homopolymers have been end capped with ester groups as disclosed in the above mentioned Kern et al. and Sittig articles and in U.S. Patent 2,998,409, for example, it has been found that these materials are not resistant to alkaline hydrolysis. Thus, these homopolymers are very suitable for use in this invention, as the materials which are hydrolyzed and removed from the polymeric mixture, thereby resulting in the formation of cavities which results in a cellular polymeric structure. The preferred homopolymers have a melting point of at least 150° C.

The term "alkaline hydrolysis" is meant to include the reaction of portions of the polymers with certain chemical reactants under conditions wherein the pH is maintained at or above 7. Thus in this particular usage the term alkaline is to be regarded as the equivalent as nonacidic, thus including both neutral and alkaline conditions. A preferred chemical reactant is water, but in place of part or all of the water an organic hydroxy-containing material, such as an alcohol may be used. As used herein, the term "hydrolysis" includes "alcoholysis." Suitable alcohols include aliphatic alcohols and preferably those containing from 1 to 20 carbon atoms including methyl alcohol, ethyl alcohol, n-propyl alcohol, isopropyl alcohol, n-butyl alcohol, isobutyl alcohol, sec-butyl alcohol, tert-butyl alcohol, the amyl alcohols, the hexyl alcohols, octyl alcohols including capryl alcohol, decyl alcohol, lauryl alcohol, myristyl alcohol, cetyl alcohol, stearyl alcohol, beta-methoxyethyl alcohol, etc. Other suitable alcohols include the aromatic alcohols, preferably those having 1 to 20 carbon atoms, including benzyl alcohol, alpha-phenylethyl alcohol, betaphenylethyl alcohol, o-methylbenzyl alcohol, diphenylcarbinol, triphenylcarbinol, o-ethylbenzyl alcohol, p-propylbenzyl alcohol, 2-methylolbenzyl alcohol, 3-ethylolbenzyl alcohol, 3-methylol alpha-phenylethyl alcohol, Other suitable alcohols include cycoaliphatic alcohols, preferably those having from 1 to 20 carbon atoms including cyclopentyl carbonyl dicyclohexyl-1,-1'-diol, 1,2-dimethylcyclopentane-1,2-diol, cyclopentyl alcohol, 1,2-dimethylcyclopentyl alcohol, 1-methylcyclohexyl alcohol, 3-methylcyclohexyl alcohol, 2-propylcyclopentyl alcohol, 2,2-dimethylcyclopentyl alcohol, cyclopentylethyl methylol, cyclohexylethyl methylol, etc.

Other suitable alcohols include the polyhydric alcohols, some of which have been mentioned above, preferably those containing from 1 to 20 carbon atoms, such as ethylene glycol, glycerol, diethylene glycol, pentamethylene glycol, propylene glycol, trimethylene glycol, 1,2-butanediol, 1,3-butanediol, 1,4-butanediol, hexamethylene glycol, trimethylolpropane, trimethylolethane, quercitol, inositol, 1,8-octanediol, 1,3,7-octanetriol, etc.

The above mentioned alcohol is preferably present in the form of a mixture with water. A mixture containing from between about 10 and about 40 weight percent of the alcohol is suitable. This mixture reduces the density of the hydrolysis medium, thus tends to prevent the shaped article from floating. The alcohol mixture also improves the wetting properties of the hydrolysis solution.

Formaldehyde is the principal hydrolysis degradation product of oxymethylene polymers and it is believed to be formed by the successive detachment of terminal oxymethylene units from the end of the polymer chain. The non-hydrolysis-resistant ester groups with which the oxymethylene homopolymers may be terminated are removed by the hydrolysis treatment which then leaves the oxymethylene polymeric chain terminated by hydroxy-substituted oxymethylene (—$CH_2OH$) units. Detachment of the oxymethylene group shifts the hydrogen atom of the hydroxyl group to the oxygen atom of the next oxymethylene group which in turn, becomes the terminal group. The process is repeated until the polymer is completely degraded.

Normally, ether end groups are resistant to alkaline hydrolysis and the polymer does not degrade unless the end groups are removed by some other process.

The oxymethylene copolymers disclosed above are normally terminated by oxyethylene groups or other suitable groups having a carbon-to-carbon bond therein. This carbon-to-carbon bond is resistant to alkaline hydrolysis. Even if the carbon-to-carbon containing end group is removed, the oxymethylene copolymer will degrade only to the next carbon-to-carbon bond, thus providing an inherently stable molecular structure.

The alkaline material used is preferably water soluble or soluble in the organic hydroxy-containing material and may be a strongly basic hydroxide such as the hydroxide of an alkali metal or alkaline earth metal, or it may be the salt of a strong base and a weak acid or it may be ammonia or an organic base, such as an amine or an amidine.

Among the specific alkaline materials which may be used are sodium hydroxide, potassium hydroxide, sodium carbonate, sodium acetate, ammonium hydroxide, triethanolamine, tripropylamine, tetramethylguanidine, trimethylamine, triethylamine and tributylamine.

The amount of alkaline material used may vary widely, depending on the specific polymer, specific alkaline material and the hydrolysis conditions.

From zero to about 10 pounds of alkaline material may be used per pound of polymer, but preferably at least 0.001 pound of alkaline material per pound of polymer should be present. When no alkaline material is used, it is desirable to hydrolyze in a buffered system since the products of hydrolysis are acidic and would cause the system to become acidic. Acidic degradation is not selective.

The preferred proportion of alkaline material is from about 0.001 to about 0.2 pound of alkaline material per pound of polymer hydrolyzed. The water, or other hydrolysis medium, is suitably present in amounts between 0.001 and about 100 pounds per pound of polymer hydrolyzed and preferably between about 5 and about 10 pounds per pound of polymer hydrolyzed.

Hydrolysis temperatures are preferably elevated, for example, in a range from about 100 to about 140° C. In some cases, it may be desirable to have the hydrolysis take place under pressure between atmospheric and about 250 p.s.i.g. The time of the hydrolysis reaction depends upon a number of factors, and preferably should take place between about 1 minute and about 5 hours.

The polymers may be blended together in any suitable fashion including mechanical mixing. It may also be desirable in certain instances to prepare a mixture of the polymers by forming a solution or dispersion of both polymers in the common solvent or dispersion medium and subsequently evaporating the solvent or dispersion medium. Suitable dispersants include water or acetone.

In accordance with another aspect of the invention, the cellular shaped structures which may be produced as described above, are impregnated with lubricants to yield permanently lubricated parts, such as bearings, gaskets, etc. Suitable methods of impregnating the cellular structures with lubricants includes placing the molded porous article in a vacuum and then immersing in the lubricant. Also it may be desirable to dilute the lubricant in a suitable solvent to lower its surface tension so that penetration of the lubricant into the cavities of the cellular structure can occur. The solvent is then removed by evaporation and other methods involving the use of pressure impregnating techniques.

Suitable lubricants include petroleum oils, silicone oils, vegetable oils and synthetic lubricants of the organic ester or phosphate ester type.

The cellular polymer structures of this invention are useful in a wide variety of applications, e.g. machine parts or other objects normally subjected to frictional wear in the case of the permanently lubricated articles as described above, insulation, articles wherein a combination of lightness and high strength are desirable such as flotation equipment, e.g. boat parts and lifesavers, aircraft parts, etc. In addition, porous films and plates made in accordance with this invention may be used as filters, e.g. gasoline filters in automobiles. For the latter application it may be necessary to sinter the porous article to increase its strength, e.g. by heating it to a temperature in the range of 150 to 160° C. for a period of 1 to 10 minutes.

In particular, a blend of two oxymethylene polymers having different resistances to alkaline hydrolysis, e.g. a mixture of a hydrolysis or thermally stabilized copolymer and an oxymethylene homopolymer "capped" with acetate groups to improve its thermal stability but not its resistance to hydrolysis, may be used to fabricate articles only a portion of which is rendered porous by alkaline hydrolysis. Thus the latter blend may be used to form a filter cartridge having a housing portion and a relatively thin filter portion, and only the thin filter portion subjected to alkaline hydrolysis to render it porous. In this type of article, the portion which is not rendered porous by alkaline hydrolysis will still be strong and thermally stable.

It should be noted that preferred cellular structures of this invention have connected cavities so that the degradable polymer can be removed, thus the resulting structure tends to be stronger than the normal foamed structure because there are no microscopic bubbles or cavities throughout the structure. This invention results in a structure in which the solid parts between the cavities are themselves void-free.

In the preferred embodiments of this invention, the hydrolysis-degradable polymer is present in an amount between about 1 to about 80 weight percent with the hydrolysis resistant polymer present in an amount between about 99 and 20 weight percent.

In the following examples the oxymethylene copolymer, unless otherwise specified, is a copolymer of trioxane and about 2 weight percent of ethylene oxide which has been stabilized by having its terminal oxymethylene groups removed as described previously and which have been chemically stabilized by the addition of about 0.1% of cyanoguanidine and about 0.5% of 2,2'-methylene bis (4-methyl-6-tertiary butyl phenol).

Example I

Equal parts by weight of the above oxymethylene copolymer and a commercial acetate end-capped oxymethylene homopolymer were separately ground and screened to a size between about −100 +200 mesh and were thoroughly mixed by tumbling. The mixture was charged to a die of suitable shape to produce a compression-molded cup of a size and of a shape suitable for a gasoline filter element for an automotive gasoline engine. The mold is heated to a temperature of about 180° C. at a pressure of about 5000 p.s.i.g. for about 6 minutes. The mold is cooled below about 150° C., the pressure is released and the molded cup is removed. The cup is then immersed in a boiling solution of 45 weight percent of sodium hydroxide in water for a period of three hours. The cup was then removed, washed thoroughly with water, then with 2% acetic acid and again with water. The part was dried in an oven at 105° C. for two hours. The article produced was a cellular structure which had excellent strength and yet would act satisfactorily as a filter.

Example II 60 parts by weight of the oxymethylene copolymer described above and about 40 parts by weight of a commercial acetate end-capped homopolymer are separately ground and screened to between −200 and +325 mesh and thoroughly mixed by tumbling. This mixture was molded as in Example I to produce a cylinder in a shape suitable for use as a bearing for an automotive washing machine pump impeller.

The part is hydrolyzed and dried as in Example I and is then placed in a vacuum chamber and evacuated to a pressure of about 10 mm. Hg absolute. The chamber is isolated from the vacuum source and a lubricating oil heated to a temperature of about 100° C. is introduced in an amount sufficient to completely cover the molded part. The vacuum is released and the part is allowed to remain immersed in the hot oil for a period of about two hours after which it is removed and, after excess oil is rinsed off with light naphtha, the part is wiped dry. This treatment provides a strong part having a cellular structure which is impregnated with a lubricant to give long term lubrication and high strength.

Example III 50 parts by weight of an oxymethylene homopolymer having ether end caps and about 50 weight percent of a commercial oxymethylene homopolymer having acetate end caps are separately ground and screened to between −200 and +325 mesh and are thoroughly mixed by tumbling. The mixture is charged to a cup shaped die and is compression molded as in Example I. The molded part was then hydrolyzed and treated as in Example I and produced a cellular structure having excellent strength.

It is to be understood that the foregoing detailed description is given merely by way of illustration and that many variations may be made therein without departing from the spirit of this invention.

The embodiments of the invention in which an exclusive property or privilege is claimed are defined as follows:

1. A process of forming an oxymethylene polymer cellular structure, said process comprising
    (1) forming a mixture of
        (a) an oxymethylene polymer which is resistant to alkaline hydrolysis and
        (b) an oxymethylene polymer which is susceptible to alkaline hydrolysis
    (2) forming said mixture into a shaped article and
    (3) removing at least part of said oxymethylene polymer (b) by reacting said polymer with a hydroxy-containing chemical reactant having a pH of at least 7 and being selected from the group consisting of water and an alcohol, said reaction causing degradation of said polymer.

2. The process of claim 1 wherein said oxymethylene polymer (a) is an oxymethylene homopolymer having ether end caps.

3. The process of claim 2 wherein said oxymethylene polymer (b) is a homopolymer having ester end caps.

4. The process of claim 1 wherein said oxymethylene polymer (a) is a normally solid oxymethylene copolymer having a melting point above about 150° C. and having at least one chain containing from about 60 to 99.6 mol percent of oxymethylene units interspersed with comparatively stable monomeric —OR— units where R is a divalent radical containing at least two carbon atoms directly linked to each other and positioned in the polymer chain between the two valences, with any substituents in said R radical being inert.

5. The process of claim 1 wherein said polymer (a) is present in an amount between about 20 and about 99 weight percent and said polymer (b) is present in an amount between about 1 and about 80 weight per cent.

6. The process of claim 1 wherein said cellular structure is sintered after said oxymethylene polymer (b) has been removed.

7. The process of claim 1 including the step of impregnating the cellular structure with a lubricant.

References Cited

UNITED STATES PATENTS

| | | | |
|---|---|---|---|
| 2,951,721 | 9/1960 | Asp | 264—127 X |
| 3,027,352 | 3/1962 | Walling et al. | 260—67 |
| 3,242,246 | 3/1966 | Stand | 264—49 X |
| 3,306,877 | 2/1967 | Schott et al. | 260—2.5 |

ALEXANDER H. BRODMERKEL, *Primary Examiner.*

P. A. ANDERSON, *Assistant Examiner.*